United States Patent
Wu et al.

(10) Patent No.: US 9,491,822 B2
(45) Date of Patent: Nov. 8, 2016

(54) LED DRIVER WITH ADAPTIVE DYNAMIC HEADROOM VOLTAGE CONTROL

(75) Inventors: Xuelin Wu, Plano, TX (US); Xiping Yang, Plano, TX (US); Congzhong Huang, Plano, TX (US)

(73) Assignee: Intersil Americas LLC, Milpitas, CA (US)

( * ) Notice: Subject to any disclaimer, the term of this patent is extended or adjusted under 35 U.S.C. 154(b) by 220 days.

(21) Appl. No.: 13/150,581

(22) Filed: Jun. 1, 2011

(65) Prior Publication Data

US 2012/0081016 A1 Apr. 5, 2012

Related U.S. Application Data

(60) Provisional application No. 61/388,841, filed on Oct. 1, 2010.

(51) Int. Cl.
*H05B 37/02* (2006.01)
*H05B 33/08* (2006.01)

(52) U.S. Cl.
CPC ...... *H05B 33/0827* (2013.01); *H05B 33/0815* (2013.01); *H05B 33/0839* (2013.01); *H05B 33/0851* (2013.01); *H05B 33/0887* (2013.01)

(58) Field of Classification Search
CPC ...................... H05B 33/0848; H05B 33/0827; H05B 33/0815; H05B 33/0887; H05B 33/0851; H05B 33/0839
USPC ....................................................... 315/185 R
See application file for complete search history.

(56) References Cited

U.S. PATENT DOCUMENTS

| | | | | |
|---|---|---|---|---|
| 8,049,439 B2* | 11/2011 | Zhao | ................. | H05B 33/0815 315/297 |
| 8,179,059 B2* | 5/2012 | Yang | ................. | H05B 33/0815 315/291 |
| 8,278,830 B2* | 10/2012 | Archibald | .......... | H05B 33/0827 315/209 R |
| 8,294,375 B2* | 10/2012 | Lee | ..................... | H05B 33/0815 315/185 R |
| 8,405,320 B2* | 3/2013 | Huang | ............... | H05B 33/0815 315/186 |
| 2005/0225259 A1* | 10/2005 | Green | ............................ | 315/224 |
| 2006/0186830 A1* | 8/2006 | Shami et al. | ................. | 315/291 |
| 2007/0013323 A1* | 1/2007 | De Oto | ......................... | 315/291 |

(Continued)

FOREIGN PATENT DOCUMENTS

| CN | 1723740 | | 1/2006 | |
|---|---|---|---|---|
| WO | WO2008022270 | * | 2/2008 | ............. H05B 41/36 |

OTHER PUBLICATIONS

'Op Amp Comparator with Hysteresis', eCircuit Center, http://222.ecircuitcenter.com/Circuits/op_comp/op_comp.htm, copyright 2005.*

(Continued)

*Primary Examiner* — Vibol Tan
(74) *Attorney, Agent, or Firm* — Fogg & Powers LLC

(57) ABSTRACT

A multi-channel LED driver includes a plurality of linear current regulators, each connected to a bottom of a string of series connected LEDs of a multi-channel LED that controls a bias current and the string of series connected LEDs responsive to an LED bias reference voltage. A dynamic headroom regulation voltage control circuit monitors the headroom regulation voltage at the bottom of each string of the series connected LEDs in the multi-channel LED and generates a reference voltage controlling each of the headroom regulation voltages responsive to the LED bias reference voltage.

19 Claims, 5 Drawing Sheets

(56) References Cited

U.S. PATENT DOCUMENTS

| | | | |
|---|---|---|---|
| 2008/0018266 A1* | 1/2008 | Yu et al. | 315/291 |
| 2009/0021182 A1* | 1/2009 | Sauerlaender | 315/291 |
| 2009/0230874 A1* | 9/2009 | Zhao et al. | 315/192 |
| 2009/0230891 A1* | 9/2009 | Zhao et al. | 315/308 |
| 2009/0273288 A1* | 11/2009 | Zhao et al. | 315/185 R |
| 2010/0013395 A1 | 1/2010 | Archibald et al. | |
| 2010/0026203 A1* | 2/2010 | Zhao et al. | 315/291 |
| 2010/0134040 A1* | 6/2010 | Elder | 315/294 |
| 2010/0156315 A1* | 6/2010 | Zhao et al. | 315/294 |
| 2010/0194308 A1* | 8/2010 | Zhao et al. | 315/297 |
| 2010/0201278 A1* | 8/2010 | Zhao | 315/185 R |
| 2010/0201279 A1* | 8/2010 | Zhao | 315/185 R |
| 2010/0327835 A1 | 12/2010 | Archibald | |

OTHER PUBLICATIONS

The State Intellectual Property Office of the People's Republic of China, "Notice on the Second Office Action from CN Application No. 201110299725.1 mailed Jan. 9, 2015", Jan. 9, 2015, pp. 1-8, Published in: CN.

The State Intellectual Property Office of the People's Republic of China, "First Office Action from CN Application No. 201110299725.1 mailed May 14, 2014", "from Foreign Counterpart of U.S. Appl. No. 13/150,581", May 14, 2014, pp. 1-27, Published in: CN.

Carter, "Chapter 11: Understanding Op Amp Parameters", "Op Amps for Everyone", 2008, pp. 11-1 to 11-22, Publisher: Texas Instruments.

"Op Amp Input Bias Current", "Analog Devices MT-038 Tutorial", Oct. 2008, pp. 1-5.

The State Intellectual Property Office of the People's Republic of China, "Notice on Grant of Patent Right for Invention from CN Application No. 201110299725.1 mailed Jun. 12, 2015", "from Foreign Counterpart of U.S. Appl. No. 13/150,581", Jun. 12, 2015, pp. 1-4, Published in: CN.

Taiwan International Patent Office, "Office Action from TW Application No. 100133131 mailed Jan. 30, 2016", 'from Foreign Counterpart of U.S. Appl. No. 13/150,581, Jan. 30, 2016, pp. 1-31, Published in: TW.

* cited by examiner

LED DRIVER WITH ADAPTIVE DYNAMIC HEADROOM VOLTAGE CONTROL

CROSS-REFERENCE TO RELATED APPLICATIONS

This application claims benefit of U.S. Provisional Application No. 61/388,841, filed Oct. 1, 2010, entitled LED DRIVER WITH ADAPTIVE DYNAMIC HEADROOM CONTROL, the specification of which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
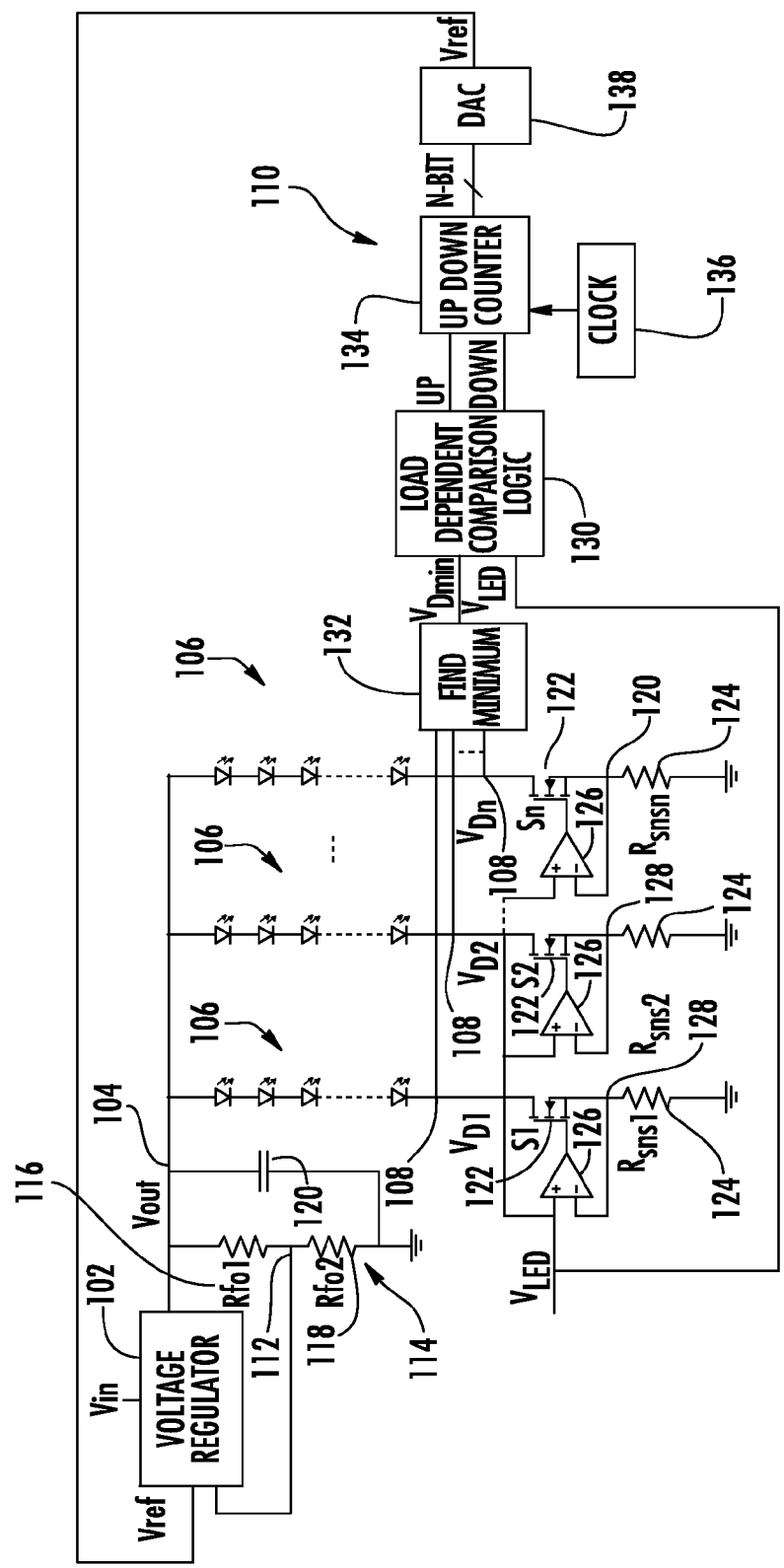
FIG. 1 is a block diagram of a multi-channel LED driver using adaptive dynamic headroom voltage control.

Referring now to the drawings, wherein like reference numbers are used herein to designate like elements throughout, the various views and embodiments of an LED driver with adaptive dynamic headroom voltage control are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In view of the expanded use of various portable electronic devices, LEDs have been widely adopted in many applications such as backlighting, illuminations, etc. Many of these applications within various portable electronic devices require multiple LEDs that are tied together in order to generate more lumens. One manner for implementing this is to place the LEDs in series such that all LEDs are running at the same time and provide the same or similar brightness. However, when more LEDs are placed in series, this increases the requirements of the required operating voltage. The higher operating voltage requirements cause a need for higher cost semi-conductor devices within the device.

Another solution is to place the LEDs in a hybrid connection where multiple strings are placed in parallel. However, this solution presents additional problems. First, the brightness balance of each channel must be maintained by the associated circuitry. Additionally, the LED forward voltage variations must be regulated. These problems are related to each other. Thus, there is a need to provide an adaptive dynamic headroom voltage control approach for multiple channel LED drivers in order to improve operating efficiency of a hybrid connection. Rather than using a fixed dynamic headroom control regulation voltage, a load dependent regulation voltage may be used to reduce power losses in all loading conditions. This type of LED driving system overcomes the problems discussed with the previously implemented solutions.

Referring now to the drawings, and more particularly to FIG. 1, there is illustrated a block diagram of a multi-channel LED driver using adaptive dynamic headroom voltage control. The circuit includes a voltage regulator 102 that may comprise a DC/DC converter such as a boost converter, buck converter, buck-boost converter, etc. The voltage regulator 102 provides a regulated output voltage $V_{OUT}$ at node 104 to a plurality of LED strings 106 that are connected in parallel with each other between node 104 and nodes 108. The voltage regulator 102 generates a single output voltage for each of the LED strings 106. The output voltage $V_{OUT}$ provided by the voltage regulator 102 is controlled by the headroom regulation voltage ($V_{D1}$ to $V_{DN}$) provided at node 108 at the bottom of each LED string 106. The multi-channel LED driver circuitry 110 ensures that the LED strings 106 have enough forward voltage to maintain the bias current through the LED strings 106. The voltage regulator 102 receives an input voltage $V_{IN}$ and a reference voltage $V_{REF}$ from the output of a multi-channel LED driver 110. The voltage regulator 102 additionally monitors a feedback voltage $V_{FB}$ that is responsive to the regulated output voltage $V_{OUT}$ supplied from the voltage regulator 102 at node 104.

The feedback voltage $V_{FB}$ is provided at a node 112 of a resistor divider circuit 114. The resistor divider circuit 114 consists of a resistor 116 connected between node 104 and node 112 and a resistor 118 connected between node 112 and ground. A load capacitor 120 is connected in series with the resistor divider 114 between node 104 and ground. The multiple parallel LED strings 106 are connected at their top ends to the output voltage node 104 and at their bottom ends to an associated node 108. Each LED string 106 consists of a plurality of LEDs that are connected in series with each other between node 104 and nodes 108. The voltage provided at the bottom of each LED string 106 at nodes 108 comprises the headroom regulation voltage. Each LED string 106 has a separate headroom regulation voltage associated therewith that is monitored by the multi-channel LED driver circuitry 110 at nodes 108.

The current through the LED string 106 is controlled by a linear current regulator consisting of transistor 122, resistor 124 and error amplifier 126. The linear regulator provides high accuracy control of the bias current through the LED string 106. In this manner, a current balance is achieved and signal $V_{LED}$ provided from a controller at a higher system level sets the bias current of the LED strings and is equal to $V_{LED}=I_{LED}*RSNS1$. $V_{LED}$ is a reference voltage used to set the current value through each LED string. The LED current is regulated to be $V_{LED}/RSNS1$. RSNS1 is resistor 124. $V_{LED}$ sets the current of the LED strings. Headroom voltages VD1 to VDN play important roles to the LED driving system. $V_{D1}$ to $V_{DN}$ must be maintained at a proper level such that the power losses on MOSFET transistor 122 for each LED channel are minimized while the LED bias current is not compromised. This means that all MOSFET transistors 122 operate in their saturated region.

The N-channel transistor 122 has its drain/source path connected between node 108 and node 128. The resistor 124 is connected between node 128 and ground. The error amplifier 126 has its output connected to the gate of transistor 122. The inverting input of error amplifier 126 is connected to node 128 and its non-inverting input is connected to receive the signal $V_{LED}$ from a controller at a higher system level. The signal $V_{LED}$ is also provided to the load dependent comparison logic 130 of the multi-channel LED driver circuitry 110. Each LED string 106 includes the same combination of the transistor 122, resistor 124 and error amplifier 126 at the headroom regulation voltage node 108 at the bottom of each LED string. The $V_{LED}$ signal is applied to the non-inverting input of each comparator 126 associated with an LED string 106.

The remainder of the multi-channel LED driver circuitry 110 includes find minimum logic 132, load dependent comparison logic 130, up-down counter 134, clock 136 and digital to analog converter 138. The find minimum logic 132 is connected to each of the nodes 108 at the bottom of each LED string 106 to detect the headroom regulation voltage from the bottom of each of the LED strings 106. The find minimum logic 132 compares each of the headroom voltages $V_{Dn}$ at the bottom of each LED string 106 to determine the minimum headroom voltage $V_{DMIN}$ and provide it to the load dependent comparison logic 130. As will be more fully described herein below, the find minimum logic 132 comprises a comparator array that determines the minimum headroom voltage of all the voltages at the bottom of each LED string 106. The find minimum logic 132 guarantees that the headroom voltage is above a safe operating region.

The load dependent comparison logic 130 receives the minimum headroom voltage $V_{DMIN}$ from the find minimum logic 132 and receives the $V_{LED}$ voltage signal. The load dependent comparison logic 130 provides UP and DOWN control signals to an up-down counter circuit 134. The load dependent comparison logic 130 is a control circuit that ensures that the headroom regulation voltages (VD1 to VDn) are low enough to achieve maximum power efficiency for driving the multiple LED strings 106. If the minimum headroom regulation voltage VDi (i=1 . . . N) is lower than a particular threshold, the load dependent comparison logic 130 generates a logical "high" value on the UP signal line. Otherwise, the load dependent comparison logic 130 generates a logical "high" value on the DOWN signal line to the up-down counter circuit 134. These UP and DOWN control values are used to alter the output voltage $V_{OUT}$ of the voltage regulator 102.

The up-down counter circuit 134 receives the UP-DOWN control signals from the load dependent comparison logic 130 and a clock signal from a clock circuit 136. The up-down counter 134, clock circuit 136 and DAC 138 act as a reference voltage generator. The reference voltage generator is driven by the internal clock signal generated by the clock circuit 136. During each cycle, the counter 134 counts the "UP" or "DOWN" signal that will increase or decrease the reference voltage $V_{REF}$. The N-bit digital signal is a digital value of a desired reference voltage $V_{REF}$. The up-down counter circuit 130 generates the N-bit digital signal to the digital to analog converter 138. The digital to analog converter 138 generates a reference voltage signal $V_{REF}$ responsive to the N-bit digital signal from the up-down counter 134 which is provided to the voltage regulator 102 as the reference voltage $V_{REF}$.

Figure 2:
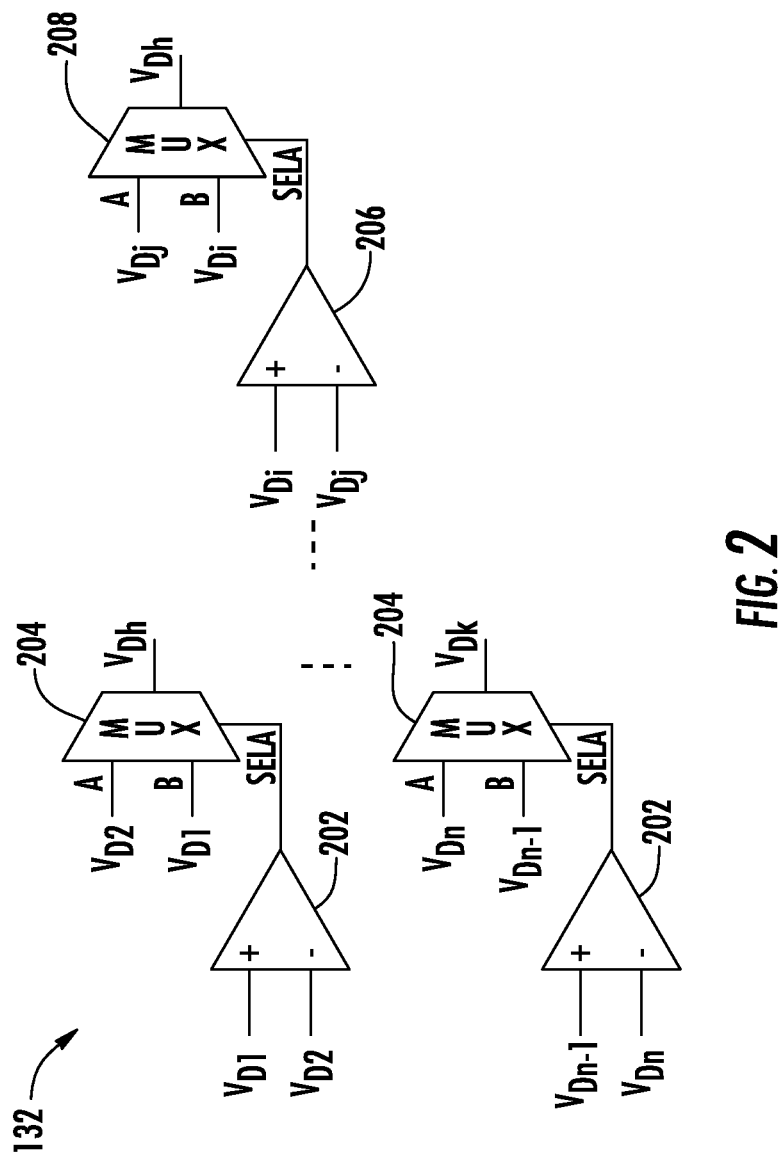
FIG. 2 is a block diagram of the control logic for determining a minimum dynamic headroom control regulation voltage.

Referring now to FIG. 2, there is illustrated a block diagram of the find minimum logic 132 of FIG. 1. Each of the headroom voltages at nodes 108 are divided into pairs and every two headroom voltages, e.g., $V_{D1}$ and $V_{D2}$, are compared with each other using a comparator 202. The smaller of the two voltages is output from an associated multiplexer 204 such that this voltage may be compared with a lower voltage provided from another multiplexer 204. In this way, the minimum voltage determined by comparator 202 is output from the multiplexer 204 such the voltage they may be compared in another comparator 206 which will output the lower of another two headroom voltages from another multiplexer 208. This process will continue until the last two minimum voltages are compared, and the minimum overall headroom voltage $V_{DMIN}$ is determined. Thus, N−1 comparators are used to determine the minimum headroom voltage $V_{DMIN}$. This is a much more efficient process than using direct comparison where each headroom voltage ($V_{Di}$) is directly compared to a threshold and would require $2^N$ comparators. Thus, the comparison process described within the find minimum logic 132 is much more die size efficient.

As illustrated in FIG. 2, a comparator 202 compares each pair of adjacent headroom voltages from each of the nodes 108 at the bottom of an LED string 106. The result of each comparison from a comparator 202 is used to control a multiplexer 204 that is also receiving the two headroom voltages that are being compared at the comparator 202. The output of the comparator 202 selects the minimum voltage from the multiplexer 204 this is provided at the output thereof. The multiplexer 204 provides its outputs to a next set of comparators 206 that compare additional pairs of voltages to generate a further selection control signal. This selection control signal again selects from a multiplexer 208 the minimum of the pair of threshold voltages compared at the comparator 206. The process continues through multiple layers of circuitry consisting of comparators 202 and multiplexers 204 until only a single threshold voltage, the minimum threshold voltage, $V_{DMIN}$ is remaining. This is the signal that is provided to the input of the load dependent comparison logic 130.

Figure 3:
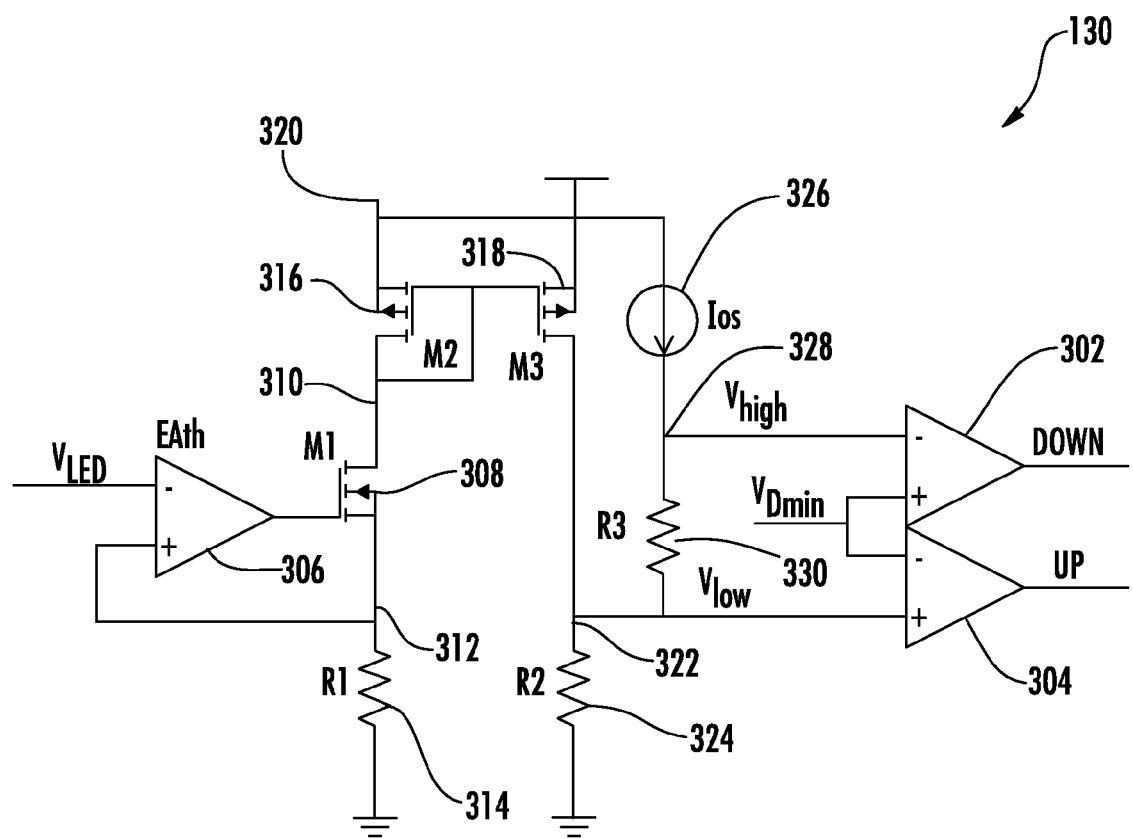
FIG. 3 is a schematic block diagram of the logic for generating a load dependent threshold voltage within an adaptive dynamic headroom voltage control scheme.

Referring now to FIG. 3, there is illustrated a schematic block diagram of the load dependent comparison logic 130. If $V_{DMIN}$ is higher than $V_{HIGH}$, the DOWN signal is set to a logical "high" level indicating that the output of the voltage regulator 102 $V_{OUT}$ needs to drop. If $V_{DMIN}$ is lower than $V_{LOW}$, the UP control signal is set to a logical "high" level indicating that the output voltage $V_{OUT}$ of the voltage regulator 102 needs to rise. The load dependent comparison logic 130 generates the DOWN control signals and UP control signals responsive to minimum threshold voltage $V_{DMIN}$ and two load dependent threshold voltages $V_{HIGH}$ and $V_{LOW}$. The load dependent comparison logic 130 includes a pair of comparators 302 and 304 for generating the DOWN and UP control signals. The $V_{HIGH}$ load dependent threshold voltage is applied to the inverting input of comparator 302 while the minimum threshold voltage $V_{DMIN}$ is applied to the non-inverting input of comparator 302. Comparator 302 generates the DOWN control signal when $V_{DMIN}$ exceeds $V_{HIGH}$. The load dependent threshold voltage $V_{LOW}$ is applied to the non-inverting input of comparator 304, and the minimum threshold voltage $V_{DMIN}$ is applied to the inverting input of comparator 304. This is used to generate the UP control signal when the $V_{DMIN}$ voltage falls below the $V_{LOW}$ load dependent threshold voltage. The remainder of the circuitry of FIG. 3 is used for generating the load dependent threshold voltages $V_{HIGH}$ and $V_{LOW}$.

The LED bias voltage reference $V_{LED}$ is applied to the non-inverting input of amplifier 306. Error amplifier 306, N-channel transistor 308 and resistor 314 form a current source, the current of whish is $V_{LED}/R1$ (tracking the current of the LED strings), which is turned around by 316-318 current mirror and create a $V_{low}$ voltage on resistor 324. The output of the error amplifier 306 is provided to the gate of N-channel transistor 308. N-channel transistor 308 has its drain/source path connected between node 310 and node 312. A resistor 314 is connected between node 312 and ground. The inverting input of error amplifier 306 is connected to node 312. A current mirror consisting of transistors 316 and 318 is connected to the drain of transistor 310. Transistor 316 comprises a P-channel transistor having its source/drain path connected between node 320 and node 310. Transistor 318 is an P-channel transistor having its source/drain path connected between $V_{SS}$ and node 322. The gates of transistors 316 and 318 are connected with each other and to node 310. Node 322 provides the low load dependent threshold voltage $V_{LOW}$ which is provided to the non-inverting input of comparator 304. A resistor 324 is connected between node 322 and ground. A current source $I_{OS}$ 326 is connected between node 320 and node 328. Node 328 provides the high load dependent threshold voltage $V_{HIGH}$ at node 328 to the inverting input of comparator 302. A resistor 330 is connected between node 328 and node 322.

The LED bias voltage $V_{LED}$ is scaled according to the ratio of resistor 324 and 314 in the ratio of R2/R1. An offset current is overlaid on $V_{LED} \times R2/R1$. Thus, the low load dependent threshold voltage $V_{LOW} = V_{LED} \times R2/R1 + I_{OS} \times R2$, and the high load dependent threshold voltage $V_{HIGH} = V_{LED} \times R2/R1 + I_{OS} \times R2 + I_{OS} \times R3$. $I_{OS} \times R3$ comprises a hysteresis voltage. As long as $V_{DMIN}$ is within the range of the hysteresis voltage, the output voltage $V_{OUT}$ remains unchanged. $V_{HIGH}$ and $V_{LOW}$ should be high enough such that under all conditions, MOSFET transistor 122 (FIG. 1) can sustain the LED bias voltage with enough margin. The worst case scenario happens in high temperature and low driving voltage as the channel resistance is high.

Figure 4:
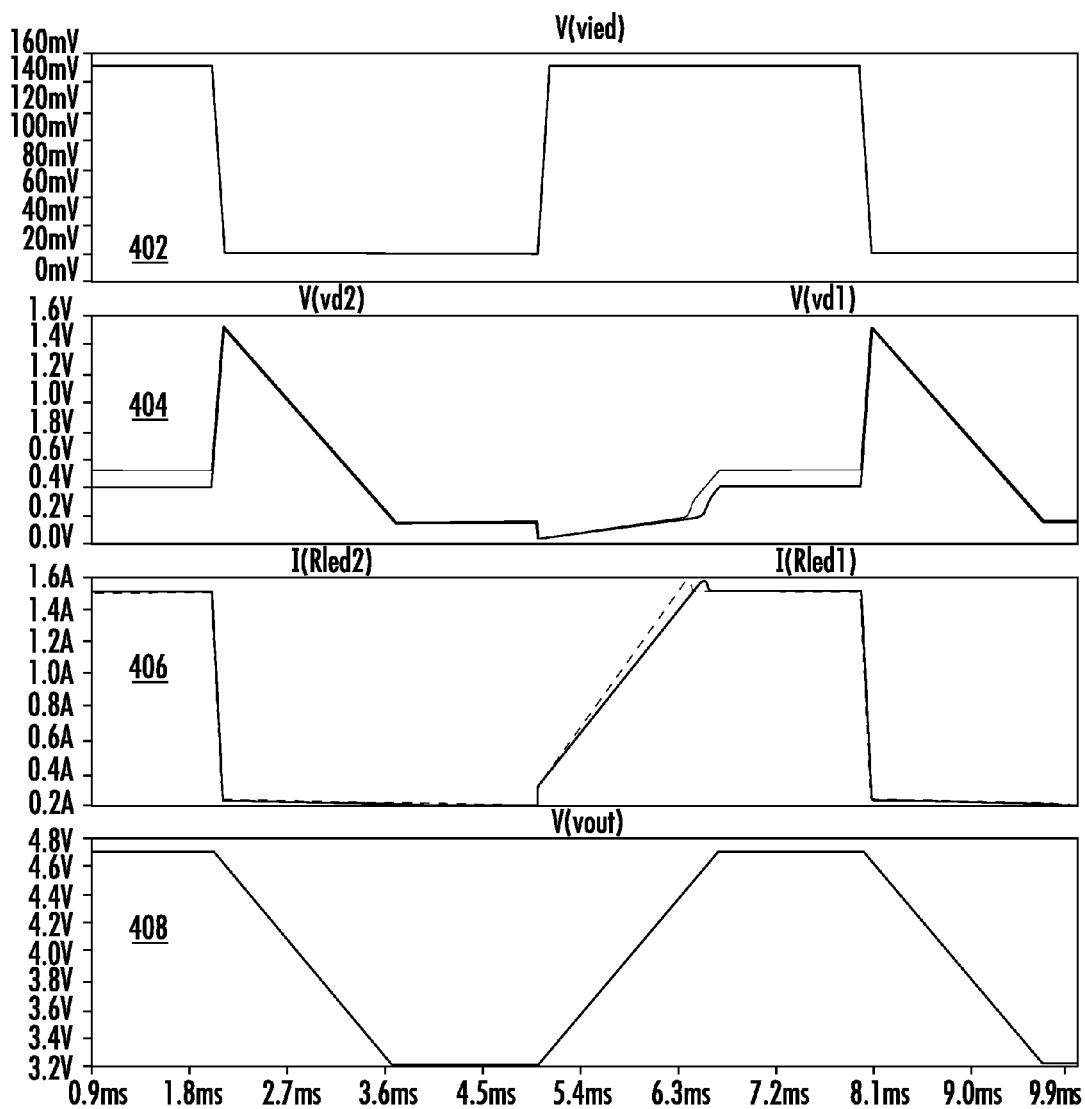
FIG. 4 illustrates various waveforms associated with the operation of the dynamic headroom voltage control circuit of FIG. 1.

Referring now to FIG. 4, there is illustrated the operation of the LED drivers. In this configuration, two strings of LEDs are deployed with different forward voltages. Plane 402 illustrates the LED current reference signal $V_{LED}$, changing this signal changes the LED brightness. It is set to be up and down for demonstration purposes. The second pane 404 illustrates two headroom regulation voltages of the different LED voltages. The third pane 406 illustrates the LED bias currents of different strings that are equal in a steady state. Finally, the fourth pane, 408, illustrates the output voltage of the voltage regulator 102 as it changes following the trend of the LED bias voltage current as desired.

Figure 5:
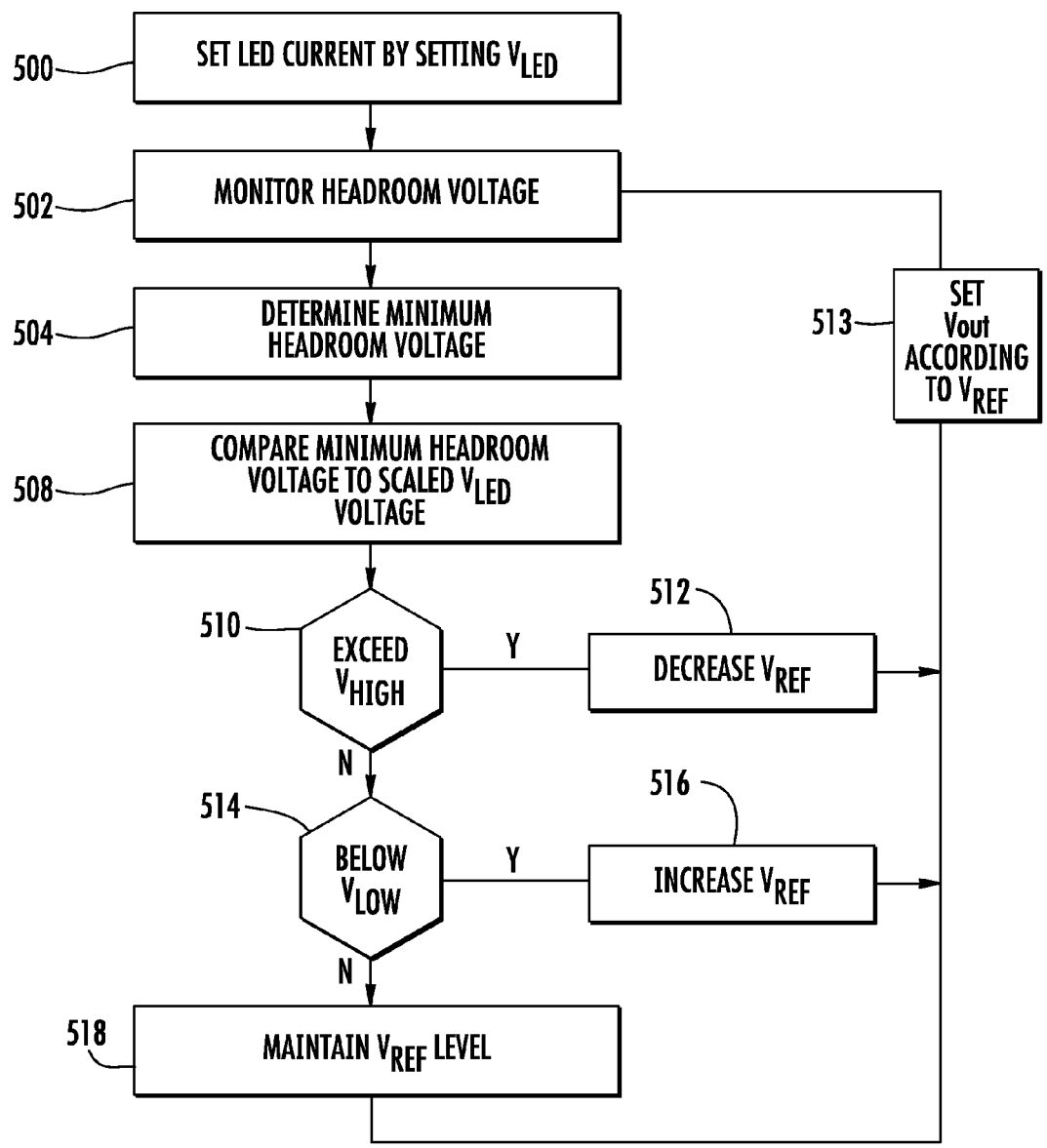
FIG. 5 illustrates a flow diagram describing the operation of the circuit of FIG. 1.

Referring now to FIG. 5, there is illustrated a flow diagram describing the operation of the circuit of FIG. 1. Initially, the LED current is set by setting VLED at step 500. The headroom regulation voltage is monitored at nodes 108 at the bottom of each LED string at step 502. A determination is made by the find minimum logic 132 of the minimum headroom regulation voltage at step 504 using the layered comparator circuitry described with respect to FIG. 2. The minimum headroom regulation voltage is compared with a scaled VLED voltage of $V_{LOW}$ and another threshold voltage $V_{HIGH}$ whish is an offset voltage higher than $V_{LOW}$. and load dependent threshold voltages at step 508. Inquiry step 510 determines if the headroom regulation voltage exceeds the high load dependent threshold voltage. If so, a signal is generated to decrease the reference voltage at step 512 which will alter the output voltage at step 513 within the voltage regulator 102. If inquiry step 510 determines that the headroom regulation voltage does not exceed the high load dependent threshold voltage, inquiry step 514 determines if the headroom regulation voltage is below the low load dependent threshold voltage $V_{LOW}$. If so, the reference voltage is caused to increase at step 516 which will increase the reference voltage when $V_{OUT}$ is set according to $V_{ref}$ at step 513. If inquiry step 514 does not determine that the headroom regulation voltage is below the low load dependent threshold voltage, the reference voltage is maintained at step 518 at its present level. The reference level will cause the $V_{OUT}$ to be set at the present level at step 513.

Using the above-described approach, better efficiency within light and medium load operating conditions of a voltage regulator may be achieved. This will extend the battery life of a portable electronic device in a simple and robust manner. The adaptive dynamic headroom control approach uses a load dependent voltage for the DHC regulation voltage instead of a fixed value. This improves the efficiency in light and medium load conditions in the described manner.

It will be appreciated by those skilled in the art having the benefit of this disclosure that this LED driver with adaptive dynamic headroom voltage control provides improved control of a multi-LED string. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multi-channel LED driver, comprising:

a plurality of linear current regulators, each linear current regulator connected to a bottom of a corresponding string of a plurality of strings of series connected LEDs of a multi-channel LED array, for controlling a bias current in the corresponding sting of the series connected LEDs responsive to an LED bias reference voltage; and a dynamic headroom regulation voltage control circuit monitoring a plurality of headroom regulation voltage at a plurality of bottoms of the plurality of strings of the series connected LEDs of the multi-channel LED and for generating a reference voltage controlling the plurality of headroom regulation voltages responsive to the LED bias reference voltage, the dynamic headroom regulation voltage control circuit comprising:

first control logic configured to determine a minimum headroom regulation voltage from the monitored plurality of headroom regulation voltages; and second control logic including a first comparator, a second comparator, and an input offset current source coupled to at least one of the first comparator and the second comparator, wherein the second control logic is configured to compare the minimum headroom regulation voltage with a high load dependent threshold voltage and a low load dependent threshold voltage and vary the high load dependent threshold voltage and the low load dependent threshold voltage directly proportionally with the LED bias reference voltage, the first comparator is configured to generate a first control signal to increase the reference voltage responsive to the minimum headroom regulation voltage falling below the low load dependent threshold voltage and the second comparator is configured to generate a second control signal to decrease the reference voltage responsive to the minimum headroom regulation voltage exceeding the high load dependent threshold voltage.

2. The multi-channel LED driver of claim 1, wherein the dynamic headroom regulation voltage control circuit further comprises:
a reference voltage generator for generating the reference voltage responsive to the first control signal and the second control signal.

3. The multi-channel LED driver of claim 2, wherein the second control logic is configured to generate the low load dependent threshold voltage and the high load dependent threshold voltage responsive to the LED bias reference voltage.

4. The multi-channel LED driver of claim 2, wherein the reference voltage generator further comprises:
a clock for generating a clock signal;
an up-down counter for generating a digital representation of the reference voltage responsive to the clock signal and the first control signal and the second control signal; and
a digital to analog converter for generating an analog representation of the reference voltage responsive to the digital representation of the reference voltage.

5. The multi-channel LED driver of claim 2, wherein the first control logic further comprises:
at least one comparator to compare a pair of headroom regulation voltages and generate a selection signal indicating a minimum regulation headroom voltage of the pair of headroom regulation voltages; and
at least one multiplexor configured to receive the pair of the headroom regulation voltages and select the minimum regulation headroom voltage responsive to the selection signal.

6. The multi-channel LED driver of claim 2, wherein the second control logic further comprises:
voltage generation circuitry configured to generate the low load dependent threshold voltage and the high load dependent threshold voltage responsive to the LED bias reference voltage;
the first comparator configured to compare the low load dependent threshold voltage with the minimum headroom regulation voltage and generate the first control signal responsive thereto; and
the second comparator configured to compare the high load dependent threshold voltage with the minimum headroom regulation voltage and generate the second control signal responsive thereto.

7. The multi-channel LED driver of claim 1, wherein the LED bias reference voltage sets a load current in the strings of series connected LEDs.

8. An apparatus comprising:
a voltage regulator for generating a regulated output voltage responsive to an input voltage, a reference voltage and a feedback voltage;
a plurality of LED strings, each string including a plurality of series connected LEDs, a first end of the plurality of LED strings connected to the regulated output voltage and a second end of the plurality of LED strings providing a plurality of headroom regulation voltages;
a multi-channel LED driver, comprising:
a plurality of linear current regulators, each linear current regulator connected at the second end to a corresponding string of the plurality of strings of series connected LEDs of a multi-channel LED array, for controlling a bias current in the corresponding string of series connected LEDs responsive to an LED bias reference voltage; and
a dynamic headroom regulation voltage control circuit monitoring the plurality of headroom regulation voltages and for generating a reference voltage controlling the plurality of headroom regulation voltages responsive to the LED bias reference voltage, the dynamic headroom regulation voltage control circuit comprising:
first control logic for determining a minimum headroom regulation voltage from the monitored plurality of headroom regulation voltages; and
second control logic including a first comparator, a second comparator, and an input offset current source coupled to at least one of the first comparator and the second comparator, wherein the second control logic is configured to compare the minimum headroom regulation voltage with a high load dependent threshold voltage and a low load dependent threshold voltage and vary the high load dependent threshold voltage and the low load dependent threshold voltage directly proportionally with the LED bias reference voltage, the first comparator is configured to generate a first control signal to increase the reference voltage responsive to the minimum headroom regulation voltage falling below the low load dependent threshold voltage and the second comparator is configured to generate a second control signal to decrease the reference voltage responsive to the minimum headroom voltage exceeding the high load dependent threshold voltage.

9. The multi-channel LED driver of claim 8, wherein the dynamic headroom regulation voltage control circuit further comprises:
a reference voltage generator for generating the reference voltage responsive to the first control signal and the second control signal.

10. The multi-channel LED driver of claim 9, wherein the second control logic is configured to generate the low load dependent threshold voltage and the high load dependent threshold voltage responsive to the LED bias reference voltage.

11. The multi-channel LED driver of claim 9, wherein the reference voltage generator further comprises:
a clock for generating a clock signal;
an up-down counter for generating a digital representation of the reference voltage responsive to the clock signal and the first control signal and the second control signal; and
a digital to analog converter for generating an analog representation of the reference voltage responsive to the digital representation of the reference voltage.

12. The multi-channel LED driver of claim 9, wherein the first control logic further comprises:
at least one comparator configured to compare a pair of the headroom regulation voltages and generate a selection signal indicating a minimum regulation headroom voltage of the pair of the headroom regulation voltages; and
at least one multiplexor configured to receive the pair of the headroom regulation voltages and select the minimum regulation headroom voltage responsive to the selection signal.

13. The multi-channel LED driver of claim 9, wherein the second control logic further comprises:
voltage generation circuitry configured to generate the low load dependent threshold voltage and the high load dependent threshold voltage responsive to the LED bias reference voltage;
the first comparator configured to compare the low load dependent threshold voltage with the minimum headroom regulation voltage and generate the first control signal responsive thereto; and the second comparator configured to compare the high load dependent threshold voltage with the minimum headroom regulation voltage and generate the second control signal responsive thereto.

14. The multi-channel LED driver of claim 8, wherein the LED bias reference voltage sets a load current in the strings of connected LEDs.

15. A method for driving a multi-channel LED array, comprising the steps of:

monitoring a plurality of headroom regulation voltages at a plurality of bottoms of a plurality of LED strings of a multi-channel LED array;

generating a reference voltage controlling the plurality of headroom regulation voltages responsive to a second reference voltage setting a current through each of the LED strings, by overlaying an input offset current of at least one comparator on the high load dependent threshold voltage and the low load dependent threshold voltage, varying the high load dependent threshold voltage and the low load dependent threshold voltage directly proportionally with the second reference voltage, determining a minimum headroom regulation voltage from the monitored plurality of headroom regulation voltages, comparing the minimum headroom regulation voltage with the high load dependent threshold voltage and the low load dependent threshold voltage, generating at least one control signal responsive to the comparing, and generating the reference voltage responsive to the at least one control signal; and regulating the plurality of headroom regulation voltages at the bottoms of the LED strings responsive to the reference voltage.

16. The method of claim 15, wherein the step of generating the at least one control signal further comprises the step of generating a first control signal responsive to the minimum headroom voltage exceeding the high load dependent threshold voltage, wherein the first control signal decreases the reference voltage.

17. The method of claim 16, wherein the step of generating the at least one control signal further comprises the step of generating a second control signal responsive to the minimum headroom voltage exceeding the low load dependent threshold voltage, wherein the second control signal increases the reference voltage.

18. The method of claim 15, wherein the step of comparing further comprises the steps of:

generating the high load dependent threshold voltage responsive to the second reference voltage; and generating the low load dependent threshold voltage responsive to the second reference voltage.

19. The method of claim 15, wherein the step of determining further comprises the steps of:

(a) comparing at least one pair of the headroom regulation voltages to determine the minimum headroom regulation voltage;

(b) generating a control signal indicating the minimum headroom regulation voltage;

(c) multiplexing the minimum headroom regulation voltage as an output responsive to the control signal; and (d) repeating steps (a)-(c) until only a single minimum headroom voltage remains.

\* \* \* \* \*

UNITED STATES PATENT AND TRADEMARK OFFICE
CERTIFICATE OF CORRECTION

PATENT NO. : 9,491,822 B2  
APPLICATION NO. : 13/150581  
DATED : November 8, 2016  
INVENTOR(S) : Wu et al.

Page 1 of 2

It is certified that error appears in the above-identified patent and that said Letters Patent is hereby corrected as shown below:

In the Claims

At Claim 1, Column 6, Line 35, replace "sting" with --string--.

At Claim 1, Column 6, Line 46, replace "control logic" with --control circuit--.

At Claim 1, Column 6, Line 49, replace "control logic" with --control circuit--.

At Claim 1, Column 6, Line 52, replace "control logic" with --control circuit--.

At Claim 3, Column 7, Line 8, replace "control logic" with --control circuit--.

At Claim 5, Column 7, Line 23, replace "control logic" with --control circuit--.

At Claim 5, Column 7, Line 24, replace "at least one comparator to compare" with --at least one comparator configured to compare--.

At Claim 6, Column 7, Line 33, replace "control logic" with --control circuit--.

At Claim 8, Column 8, Line 6, replace "control logic" with --control circuit--.

At Claim 8, Column 8, Line 9, replace "control logic" with --control circuit--.

At Claim 8, Column 8, Line 13, replace "control logic" with --control circuit--.

At Claim 10, Column 8, Line 35, replace "control logic" with --control circuit--.

Signed and Sealed this  
Second Day of May, 2017

Michelle K. Lee  
*Director of the United States Patent and Trademark Office*

CERTIFICATE OF CORRECTION (continued)
U.S. Pat. No. 9,491,822 B2

At Claim 12, Column 8, Line 50, replace "control logic" with --control circuit--.

At Claim 13, Column 8, Line 61, replace "control logic" with --control circuit--.